(12) United States Patent
Smith

(10) Patent No.: US 6,619,543 B1
(45) Date of Patent: Sep. 16, 2003

(54) URL-ENCODED INTERNET ACCESS CARD FOR RETRIEVING AND VIEWING E-MAIL AT A FUEL DISPENSER

(75) Inventor: Ervin M. Smith, Monroe, IN (US)

(73) Assignee: Tokheim Holding B.V. (NL)

( * ) Notice: Subject to any disclaimer, the term of this patent is extended or adjusted under 35 U.S.C. 154(b) by 0 days.

(21) Appl. No.: 09/767,616

(22) Filed: Jan. 23, 2001

(51) Int. Cl.[7] ................................................. G06K 7/10
(52) U.S. Cl. .................... 235/381; 235/462.01; 235/375
(58) Field of Search ................................. 235/462, 472, 235/494, 375, 383, 454, 381

(56) References Cited

U.S. PATENT DOCUMENTS

| | | | |
|---|---|---|---|
| 5,327,066 A | 7/1994 | Smith | |
| 5,422,624 A | 6/1995 | Smith | |
| 5,473,143 A | 12/1995 | Vak et al. | |
| 5,499,181 A | 3/1996 | Smith | |
| 5,717,374 A | 2/1998 | Smith | |
| 5,742,229 A | 4/1998 | Smith | |
| 5,806,018 A | 9/1998 | Smith et al. | |
| 5,859,628 A | 1/1999 | Ross et al. | |
| 5,902,985 A | 5/1999 | Bos et al. | |
| 5,914,654 A | 6/1999 | Smith | |
| 5,953,504 A | 9/1999 | Sokal et al. | |
| 5,980,090 A * | 11/1999 | Royal et al. ................. | 700/216 |
| 5,995,105 A | 11/1999 | Reber et al. | |
| 6,000,608 A | 12/1999 | Dorf | |
| 6,018,293 A | 1/2000 | Smith | |
| 6,052,629 A | 4/2000 | Leatherman et al. | |
| 6,055,592 A | 4/2000 | Smith | |
| 6,067,008 A | 5/2000 | Smith | |
| 6,070,156 A | 5/2000 | Hartsell, Jr. | |
| 6,073,840 A | 6/2000 | Marion | |
| 6,078,896 A | 6/2000 | Kaehler et al. | |
| 6,085,177 A | 7/2000 | Semple et al. | |
| 6,089,284 A | 7/2000 | Kaehler et al. | |
| 6,094,644 A | 7/2000 | Hillson et al. | |
| 6,098,879 A | 8/2000 | Terranova | |
| 6,105,008 A | 8/2000 | Davis et al. | |
| 6,116,505 A | 9/2000 | Withrow | |
| 6,118,860 A | 9/2000 | Hillson et al. | |
| 6,185,542 B1 * | 2/2001 | Moran et al. ................ | 235/380 |
| 6,193,152 B1 * | 2/2001 | Fernando et al. ........... | 235/379 |
| 6,275,746 B1 * | 8/2001 | Leatherman et al. ........ | 700/234 |
| 6,334,117 B1 * | 12/2001 | Covert et al. ............... | 235/379 |
| 6,360,137 B1 * | 3/2002 | Royal et al. ................. | 700/231 |
| 6,360,138 B1 * | 3/2002 | Coppola et al. ............ | 700/231 |
| 6,375,078 B1 * | 4/2002 | Russell et al. .............. | 235/375 |
| 6,390,151 B1 * | 5/2002 | Christman et al. .......... | 141/231 |
| 2001/0042007 A1 * | 11/2001 | Klingle ........................ | 705/14 |

* cited by examiner

*Primary Examiner*—Thien M. Le
(74) *Attorney, Agent, or Firm*—Randall J. Knuth

(57) ABSTRACT

An Internet-enabled fuel dispenser includes a card reader adapted to retrieve a Uniform Resource Locator (URL) data element encoded on a card-type device furnished by the customer. The URL data element defines the Internet address of a server that hosts an e-mail messaging account preferably belonging to the customer. A client machine at the dispenser position accesses the server specified by the retrieved URL data element and receives the email messages downloaded by the server in response to the e-mail request. The customer views the downloaded e-mail messages on a display installed at the dispenser position. The dispenser position is provided with a suitable connection facility to make a networked connection to the Internet, which preferably includes the World Wide Web.

51 Claims, 2 Drawing Sheets

US 6,619,543 B1

URL-ENCODED INTERNET ACCESS CARD FOR RETRIEVING AND VIEWING E-MAIL AT A FUEL DISPENSER

BACKGROUND OF THE INVENTION

1. Field of the Invention

The present invention relates to an Internet-enabled fuel dispenser environment, and, more particularly, to a method and apparatus adapted for use at an Internet-enabled dispenser position which utilize a card encoded with the Internet address of a customer e-mail messaging account to access the server hosting the e-mail account web site, download any e-mail messages to the dispenser position, and view the downloaded messages while the refueling transaction takes place.

2. Description of the Related Art

Current advances in networking technology have made it possible to deploy internet access technology at various commercial sites in order to provide the customer with the opportunity to conduct transactions over the internet. It would also be advantageous if this internet access featured the ability to perform the various communications tasks that have attracted widespread usage of the internet, such as sending and receiving e-mails. However, it is not feasible for commercial sites such as fuel dispensers to simply import into the service station environment the familiar consumer technology that is typically used to implement an e-mail functionality, namely, a personal computer with a keyboard.

SUMMARY OF THE INVENTION

According to the present invention there is provided a method and apparatus for enabling a customer requesting a refueling transaction in a fuel dispenser environment to access the Internet at the fuel dispenser position and retrieve electronic messages from a server hosting the e-mail messaging account, as specified by an Internet address furnished by the customer. In a preferred form, a data storage device provided in the form of a portable card-type mechanism is encoded with a Uniform Resource Locator (URL) data element that specifies the Internet location of the e-mail account. The retrieved e-mail messages are downloaded by the server to the requester client machine (e.g., the computing device at the Internet-enabled dispenser position) and then presented for viewing on a suitable multi-media display.

The invention, in one form thereof, is directed to a system for use in a fuel dispenser environment. The system comprises, in combination, a connection facility enabling connection to a communications network; a data means for providing at least one resource identifier each specifying a host resource in the communications network; an access means, operatively coupled to the connection facility, for accessing the host resource specified by a one of the at least one resource identifier and for receiving information retrieved therefrom; and a means for viewing information received by the access means. The information retrieved from an accessed host resource comprises electronic messages.

In one form, the at least one resource identifier further includes at least one Uniform Resource Locator (URL) data element. The communications network further includes the Internet, while the host resource associated with each resource identifier further includes at least one server. Each resource identifier preferably corresponds to an e-mail messaging account.

The data means, in one form, further comprises in combination a device containing at least one Uniform Resource Locator (URL) data element, and a retrieval mechanism to retrieve the at least one URL data element from the device. The device further includes a card encoded with an Internet Protocol (IP) address of an e-mail account.

In another form, the data means further comprises in combination a card encoded with a network address of an e-mail account, and a reader to retrieve the network address from the card. The card preferably relates to a financial service and is adapted to contain the network address of the e-mail account.

The invention, in another form thereof, is directed to a system for use in a fuel dispenser environment having a plurality of dispenser positions. The system includes a connection means for enabling connection to a communications network. Each dispenser position respectively comprises, in combination, a mechanism to provide at least one resource identifier each specifying a host resource in the communications network, an access device to access the host resource specified by a one of the at least one resource identifier and to receive information retrieved therefrom, and a viewer to view information received by the access device. The information retrieved from an accessed host resource comprises electronic messages.

In a preferred form, the at least one resource identifier further includes at least one Uniform Resource Locator (URL) data element. Additionally, the communications network further includes the Internet, while the host resource associated with each resource identifier further includes at least one server. Each resource identifier preferably corresponds to an e-mail messaging account.

The mechanism of each respective dispenser position further comprises, in combination, a device containing at least one Uniform Resource Locator (URL) data element, and a retrieval mechanism to retrieve the at least one URL data element from the device. The device further includes a card encoded with an Internet Protocol (IP) address of an e-mail account.

Alternatively, the mechanism of each respective dispenser position includes, in combination, a card encoded with a network address of an e-mail account, and a reader to retrieve the network address from the card. The card is preferably a payment-type device adapted to contain the network address of the e-mail account.

The viewer enables viewing of e-mail messages retrieved from the e-mail account by operation of the access device using the network address.

The invention, in another form thereof, is directed to an apparatus for use in combination with a fuel dispenser environment and a communications network. The apparatus includes, in combination, a connection device to connect to the communications network; a mechanism to provide at least one Uniform Resource Locator (URL) data element each specifying a host resource in the communications network; an access device to access the host resource specified by a one of the at least one resource identifier and to receive information retrieved therefrom; and a viewer operatively coupled to the access device. The retrieved information comprises electronic messages.

The mechanism, in one form thereof, further includes in combination a portable storage device containing the at least one URL data element, and a retrieval device to retrieve the at least one URL data element from the portable storage device.

The mechanism, in another form thereof, includes in combination a card encoded with a network address of an e-mail account, and a reader to retrieve the network address from the card. The card is preferably a payment-type device adapted to contain the network address of the e-mail account.

The invention, in another form thereof, is directed to an apparatus for use in combination-with a fuel dispenser environment and a communications network. The apparatus comprises, in combination, a connection device to connect to the communications network; a card encoded with a network address of an e-mail messaging resource in the communications network; a reader to retrieve the network address from the card; and an access device to access the e-mail messaging resource using the network address and to receive information retrieved therefrom.

The apparatus further includes a viewer to view the information retrieved from the e-mail messaging resource.

The information retrieved from the e-mail messaging resource preferably comprises electronic messages. Additionally, the communications network further includes the Internet, while the network address further includes a Uniform Resource Locator (URL) data element.

The card is preferably furnished by a customer. Moreover, the card is preferably a finance-related device suitable for use in tendering payment. In one form, the card is one of a credit card and a debit card adapted to have the network address encoded thereon.

The invention, in another form thereof, is directed to a method for use in a fuel dispenser environment having a connection to a communications network. The method involves, in combination, the steps of providing at least one resource identifier each specifying a host resource in the communications network; accessing the host resource specified by a one of the at least one resource identifier; retrieving information from the accessed host resource, the retrieved information comprising electronic messages; and displaying the retrieved information.

The at least one resource identifier further includes at least one Uniform Resource Locator (URL) data element. Additionally, the communications network further includes the Internet, while the host resource associated with each resource identifier further includes at least one server.

The indicated step of providing at least one resource identifier further comprises, in combination, the steps of providing a device containing at least one Uniform Resource Locator (URL) data element; and retrieving the at least one URL data element from the device. The step of providing a device further includes providing a card encoded with an Internet Protocol (IP) address of an e-mail account.

In another form, the step of providing at least one resource identifier further comprises, in combination, the steps of providing a card-type device encoded with a network address of an e-mail account; and retrieving the network address from the card-type device.

One advantage of the present invention is that the refueling customer need only carry a single card-type mechanism encoded with the URL of the e-mail messaging account in order to acquire access to any e-mail messages.

Another advantage of the present invention is that the URL-encoded card can be simply reprogrammed to specify a different URL if the Internet address of the e-mail account changes.

A further advantage of the invention is that the apparatus for accessing the Internet and downloading the e-mail messages typically requires no modifications to the existing dispenser equipment, other than installation or making space to accommodate an Internet access kiosk.

A further advantage of the invention is that the Internet address of the e-mail account may be encoded onto a customer credit card, enabling the use of the conventional card reader typically installed at a dispenser payment terminal to retrieve the Internet address.

A further advantage of the invention is that the use of a URL-encoded card-type mechanism to facilitate Internet access removes any requirement to install at the dispenser position any data entry mechanism such as a keypad, alphanumeric touch screen, or keyboard that otherwise would be needed to enter the URL information identifying the e-mail account.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
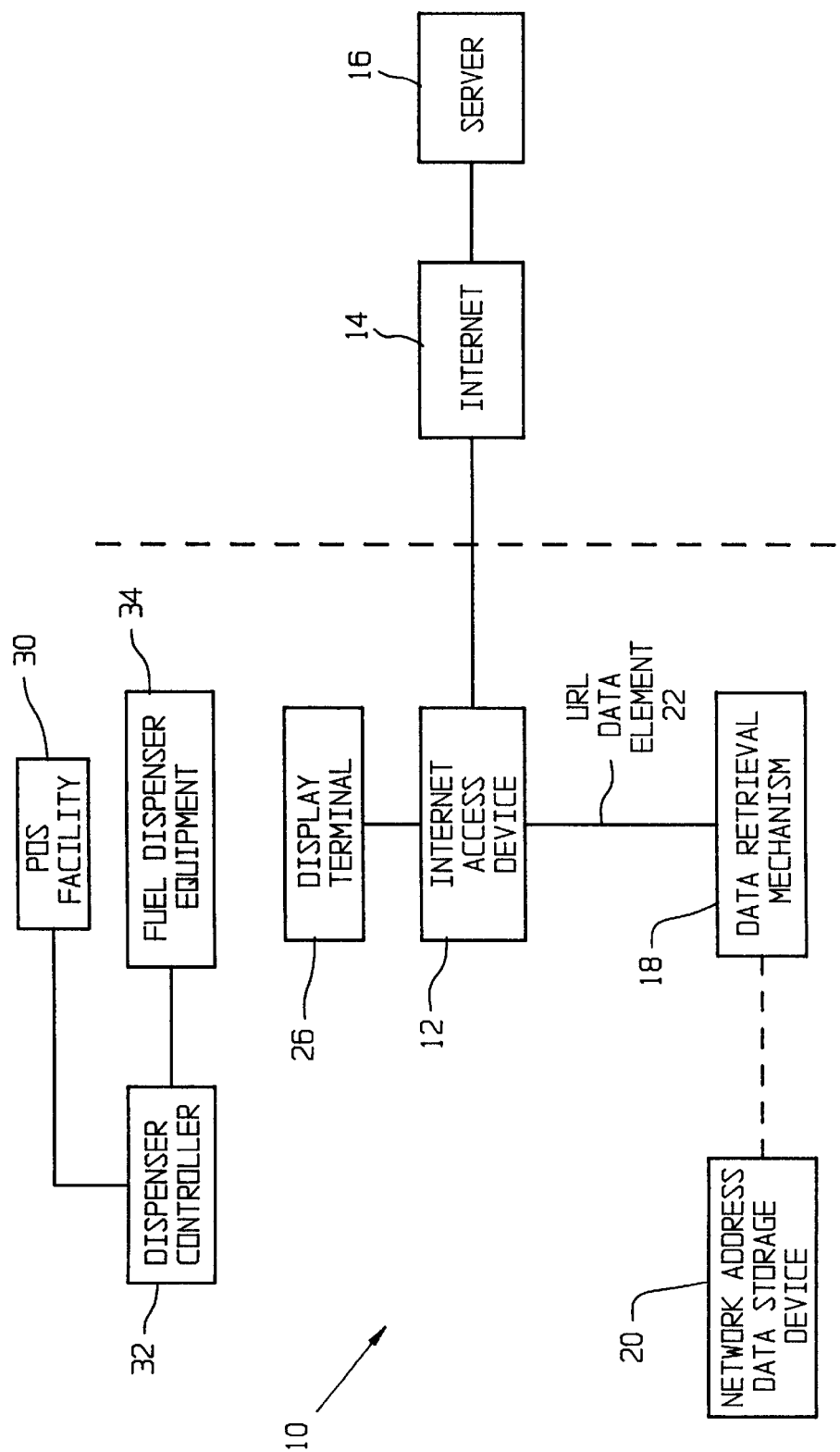
FIG. 1 is a block diagram illustration of an Internet-enabled fuel dispenser position, according to one embodiment of the present invention.

Referring now to the drawings and particularly to FIG. 1, there is shown in illustrative block diagram format an Internet-enabled fuel dispenser position 10 located at a refueling environment such as a service station facility, according to one embodiment of the present invention. Although only a single dispenser position 10 is shown for purposes of clarity, it should be apparent that the refueling environment may include a plurality of such dispenser positions 10 each dedicated to serving a particular customer.

The illustrated dispenser position 10 includes an Internet access device 12 enabling communications with Internet 14 having an interconnected network of servers 16. Internet 14 preferably includes the World Wide Web (WWW). Although Internet 14 constitutes the preferred communications facility, it should be apparent that dispenser position 10 may be suitably enabled for connection to any communications network. Accordingly, Internet access device 12 may be provided in any form suitable for establishing a networked connection to the specified communications network.

The illustrated Internet access device 12 functions in a known manner to provide access to host resources resident in Internet 14. For example, host resources available for accessing and information retrieval may include, but are not limited to, files, documents, web site pages, and any other information provided by server 16 or any other networked resource facility. In a preferred form, server 16 hosts a web site maintaining an electronic messaging (e-mail) account of conventional form.

In one form, access device 12 may be configured as a client machine or requester device to provide the well known client-server relationship facilitated by the Internet. Access device 12 may include, but is not limited to, a personal computer having a suitable connection device for connecting to Internet 14. For example, a connection to Internet 14 may be established over a conventional telephone line, a cable line, or a wireless link, thereby requiring a suitable modem or RF transceiver.

The illustrated dispenser position 10 further includes a data retrieval mechanism 18 for use in combination with a network address data storage device 20. The illustrated storage device 20 encompasses any mechanism capable of containing or otherwise bearing identification data sufficient to specify or represent the location or address of a host resource in Internet 14. Information associated with storage device 20 is preferably machine readable.

In a preferred form, this host resource identification data is provided in the form of a conventionally constructed Uniform Resource Locator (URL) data element encoded within or otherwise carried by storage device 20. For example, the URL data element may correspond to a character string such as the illustrative URL http://www.E-mailAccount.com/IncomingDirectory/messages.doc which specifies the transfer format or type of access method being used (HyperText Transfer Protocol), the server location which hosts the Web site or more generally the host name of the machine that holds the requested file (www.E-mailAccount.com), and the path name to the file (/Incoming Directory/messages.doc).

The illustrated data retrieval-mechanism 18 is configured to interact cooperatively with network address data storage device 20 to retrieve the URL data element 22 therefrom. The data storage device 20 may be provided in various alternative forms including, but not limited to, a magnetic card, a bar code device, a smart card, or wireless communications device, such as an RFID tag affixed to a vehicle. For this purpose, data retrieval mechanism 18 will be suitably implemented in the form of a magnetic card reader, a bar code reader, a smart card reader, and a wireless receiver (such as an RF transceiver). It should be apparent that data retrieval mechanism 18 will be implemented in a form tailored to the manner in which the URL data element is stored.

The URL data element 22 obtained by retrieval mechanism 18 from storage device 20 is forwarded to Internet access device 12 for use in navigating Internet 14 and accessing a host resource according to the server location address specified by URL data element 22. As well known to those skilled in the art, this access procedure generally involves Internet access device 12 formulating a request to server 16 (as specified by the URL), to which server 16 responds by processing the request and then downloading the requested information. For example, when the request involves access to an e-mail messaging resource hosted by server 16, the downloaded information will include e-mail messages.

Internet access device 12 is configured in a manner well known to those skilled in the art to incorporate a facility that suitably processes the URL data element 22, formulates an access request in accordance with the URL, and transmits the request to Internet 14. For example, access device 12 may be equipped with a suitable browser program that automatically enters the URL information into the Internet location address field and then activates the Internet connection and access procedure in accordance therewith. Examples of such browser programs include Netscape Communicator™ available from America Online of Sterling, Va. and Internet Explorer™ available from Microsoft Corporation of Redmond, Wash.

A web page document downloaded from server 16 is typically formatted in HyperText Markup Language (HTML) that requires suitable processing for subsequent presentation on display terminal 26. For example, the browser program installed on Internet access device 12 may perform a conventional operation that involves processing the downloaded file by following the HTML document format instructions to properly present the information for viewing on display terminal 26.

The illustrated display terminal 26 is preferably provided in the form of an interactive, multi-media viewing apparatus capable of allowing a viewer to scroll through multiple e-mail messages that have been downloaded from server 16. For example, display terminal 26 may include user-activated selection mechanisms such as a mouse, cursor, or pen to facilitate the selection of designated e-mail message items in order to open the message at the current location.

The downloaded information preferably includes electronic messages retrieved from an e-mail messaging resource hosted by server 16. For this purpose, the network address storage device 20 will be encoded with the network address of the e-mail messaging account (i.e., an Internet Protocol address in the form of a URL). The e-mail account which is identified by the particular network address encoded on storage device 20 will preferably belong to the individual who is in possession of device 20, namely, a refueling customer.

The illustrated network address storage device 20 is preferably provided in the form of an alterable medium enabling the information encoded thereon to be changed, revised, modified, updated, and otherwise altered. For example, when storage device 20 is implemented as a reprogrammable memory element, a simple programming operation can erase the current URL data and replace it with updated network addressing information. Additionally, it is advantageous to enable storage device 20 to contain a plurality of URL data elements, each potentially corresponding to a different e-mail account, such as a business account and a personal account.

Optionally, the Internet access device 12 and/or data retrieval mechanism 18 may be configured within a controller 32 that connects to Internet 14 and controls conventional fuel dispenser equipment 34. Controller 32 includes a conventional functionality that cooperates with POS facility 30 to manage the refueling operation in accordance with control signals issued thereto in any conventional manner, such as the amount and type of requested fuel.

Figure 2:
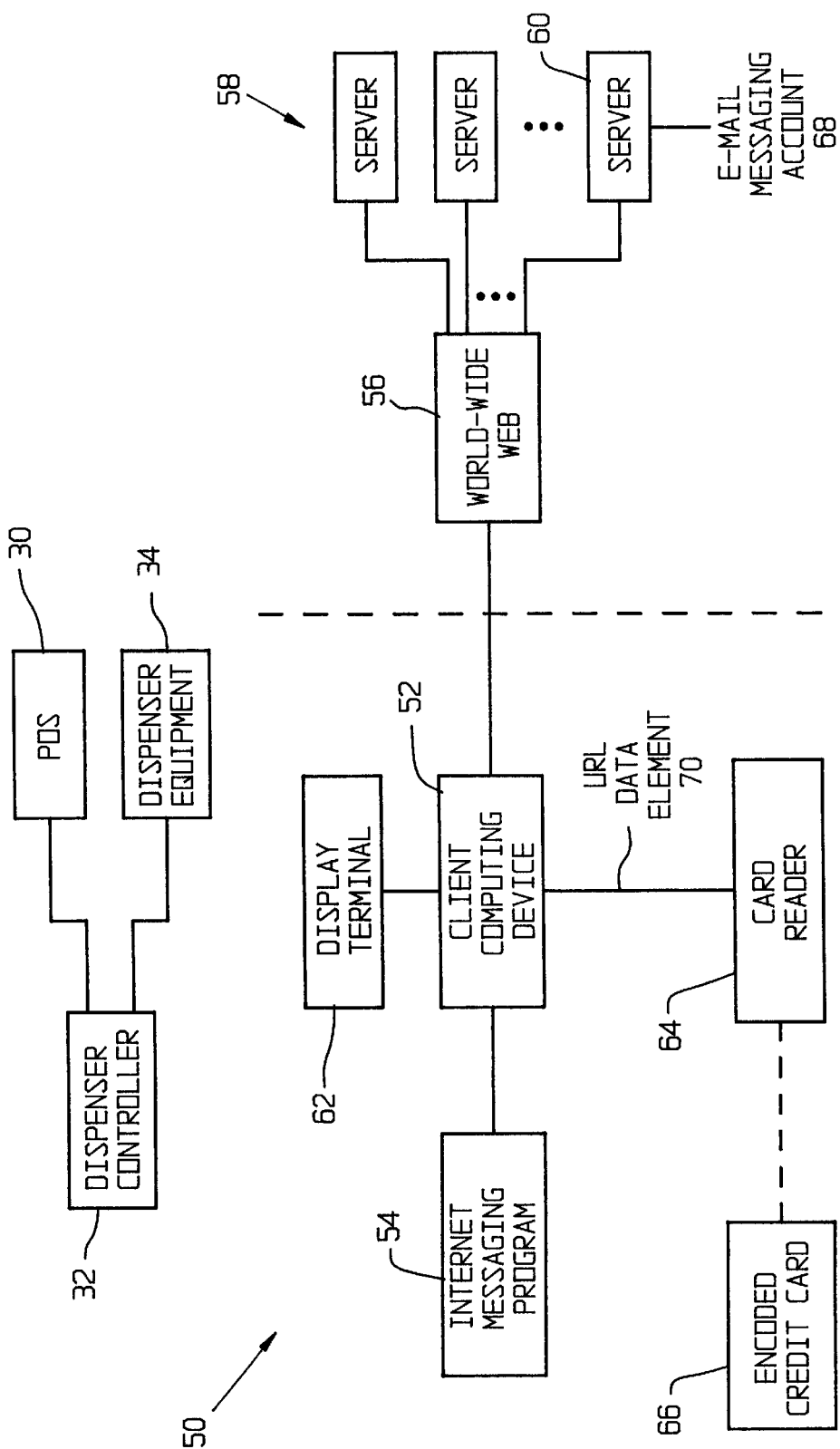
FIG. 2 is a block diagram illustration of an Internet-enabled fuel dispenser position, according to another embodiment of the present invention.

Referring now to FIG. 2, there is shown in block diagram format an Internet-enabled fuel dispenser position 50 located at a refueling environment such as a service station facility, according to another embodiment of the present invention. Although only a single dispenser position 50 is shown for purposes of clarity, it should be apparent that the refueling environment may include a plurality of such dispenser positions 50 each dedicated to serving a particular customer.

The Internet-enabled dispenser position 50 includes a computing device 52 configured as a client machine and/or user agent facility conventionally equipped with a suitable mechanism such as a browser program to enable connection and access to the Internet, particularly the World-Wide Web 56 which as known comprises a network 58 of interconnected servers 60. An appropriate network connection device is used to connect client machine 52 to Web 56, such as a modem dial-up facility connecting to Web 56 via an internet service provider (e.g., AOL).

The illustrated client machine 52 preferably includes an internet messaging program 54 generally representative of any suitable means for facilitating a network-based e-mail correspondence between a client machine and a host server that hosts the messaging resource. In particular, messaging program 54 can provide various functionalities such as e-mail composition, e-mail retrieval and viewing, and various other downloading, uploading, and viewing operations. Representative examples of commercially available messaging programs 54 include, but are not limited to, the Eudora family of programs, Internet Mail, Microsoft Exchange and Outlook, Netscape Mail, Pegasus Mail, and Windows Messaging.

A preferred feature of the present invention is that internet messaging program 54 can automatically perform a self-configuration of the various parameters and network settings necessary for establishing a connection and networked access to an internet host resource, in response to and in accordance with the URL data element 70 presented to client machine 52. For example, when Outlook™ Express is used as messaging program 54, the "Outgoing Mail" and "Incoming Mail" fields (reached by the path Tools-Accounts-Mail-<select account>-Properties-Servers) can be automatically set using URL data element 70.

Preferably, the URL-encoded storage device will also include encoded information that represents a password that can be used by client machine 52 to submit any account log-in entries required by server 60 before the messaging account can be accessed and the e-mails retrieved. For example, the retrieved password data can be automatically inserted into the relevant password field of the Outlook™ Express configuration file. The internet messaging program is preferably automatically self-activating once the parameters and fields of the configuration file have been set in accordance with URL data element 70 and any other relevant information retrieved from the encoded data storage device.

The illustrated dispenser position 50 further includes a card reader 64 connected to computing device 52. The illustrated card reader 64 is provided in the form of an insert-type reading device capable of scanning and retrieving information encoded on a card element as it is properly maneuvered through the card slot in a conventional swiping motion. For this purpose, card reader 64 works in combination with a card-type device 66 preferably furnished by the customer. Card 66 is previously encoded with at least one CRL data element specifying the Internet address of a host resource, i.e., e-mail messaging account 68 hosted by server 60.

In one form, card 66 may include a magnetic strip having the URL data element embedded, impressed, or otherwise embodied therein. More specifically, card 66 is preferably provided in the form of a commercial credit card, debit card or other such payment-type card encoded with the URL data element. For example, the credit card can be adapted so that the necessary encoded information is embedded on a magnetic track in a manner such that the pre-existing magnetic element which carries the credit card account number is not affected. For instance, the URL encoding can take place on a track different from the one used by the credit card account information.

Card reader 64 will therefore preferably be constructed in the form of a conventional magnetic card reader such as the type used in scanning credit cards. More particularly, when the network address data storage device takes the form of an encoded credit card 66, the conventional card reading apparatus installed at the dispenser payment terminal may be adapted to enable processing of the URL-encoded information. For example, the payment terminal user interface may be adapted with a selectable control mechanism that allows the user to direct the installed card reader to read the magnetic track corresponding to the encoded URL information and then forward the retrieved URL data element 70 to client machine 52.

The Internet-enabled dispenser position 50 also includes a conventional display 62 to enable viewing of the e-mail messages downloaded from server 60 via Web 56.

In operation, a customer present at dispenser position 50 supplies a URL-encoded card 66 and conventionally swipes the card through card reader 64 by first inserting and then withdrawing card 66 from the card processing slot provided by card reader 64. The information obtained by this reading operation is provided to client computing device 52 as URL data element 70. Client machine 52, in conjunction with internet messaging program 54, formulates a request for access to the Internet resource location specified by the URL data element 70.

The request is received by Web 56 and appropriately routed to the specified server 60, which then downloads the requested email messages from messaging account 68 to the client machine 52. The downloaded e-mail messages are then suitably processed in a conventional manner and presented for viewing on display 62. The customer is therefore able to open the retrieved e-mail messages at dispenser position 50 and scroll through a collection of downloaded messages to view each one.

The customer may initiate and perform the e-mail retrieval and downloading at any time, but the customer will likely take the opportunity to do so in concurrent fashion while the refueling operation is taking place. It is of course apparent that the dispenser equipment and the conventional refueling operation are not at all affected by the working features of the present invention. In particular, the refueling operation proceeds independently of the activities that the customer may be engaged in regarding the acquisition and viewing of the e-mail messages.

What has been shown and described herein is an improved method and apparatus enabling a refueling customer to retrieve and view e-mail messages at a refueling dispenser position. A URL data element supplied by the customer in the form of a reprogrammable URL-encoded card (e.g., credit card) is used to identify an e-mail messaging resource stored on a remote server connected to the World Wide Web.

An Internet access device capable of recognizing and processing the recovered URL data element formulates an access request using the URL-based network address information. A single physical device (i.e., a URL-encoded card) is now capable of being used to retrieve e-mail messages at the dispenser position from a plurality of e-mail messaging accounts hosted by a corresponding plurality of remote servers.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for use in a fuel dispenser environment, comprising:
   a connection facility enabling connection to a communications network;
   data means for providing at least one resource identifier each specifying a host resource in said communications network;
   access means, operatively coupled to said connection facility, for accessing the host resource specified by a one of the at least one resource identifier and for receiving information retrieved therefrom; and
   means for viewing information received by said access means;
   wherein information retrieved from the accessed host resource comprises electronic messages.

2. The system as recited in claim 1, wherein the at least one resource identifier further includes at least one Uniform Resource Locator (URL) data element.

3. The system as recited in claim 2, wherein said communications network further includes the Internet, and the host resource associated with each resource identifier further includes at least one server.

4. The system as recited in claim 1, wherein each resource identifier corresponds to an e-mail messaging account.

5. The system as recited in claim 1, wherein said data means further comprises:
   a device containing at least one Uniform Resource Locator (URL) data element; and
   a retrieval mechanism to retrieve the at least one URL data element from said device.

6. The system as recited in claim 5, wherein said device further includes a card encoded with an Internet Protocol (IP) address of an e-mail account.

7. The system as recited in claim 1, wherein said data means further comprises:
   a card encoded with a network address of an e-mail account; and
   a reader to retrieve the network address from said card.

8. The system as recited in claim 7, wherein said card relating to a financial service and being adapted to contain the network address of the e-mail account.

9. The system as recited in claim 8, wherein said card being adapted to have the network address of the e-mail account encoded on at least one magnetic element thereof.

10. The system as recited in claim 7, wherein said viewing means enabling viewing of e-mail messages retrieved from the e-mail account by operation of said access means using the network address.

11. A system for use in a fuel dispenser environment having a plurality of dispenser positions, said system comprising:
   connection means for enabling connection to a communications network;
   each dispenser position respectively comprising:
      a mechanism to provide at least one resource identifier each specifying a host resource in said communications network,
      an access device to access the host resource specified by a one of the at least one resource identifier and to receive information retrieved therefrom, and
      a viewer to view information received by said access device;
   wherein information retrieved from an accessed host resource comprises electronic messages.

12. The system as recited in claim 11, wherein the at least one resource identifier further includes at least one Uniform Resource Locator (URL) data element.

13. The system as recited in claim 12, wherein said communications network further includes the Internet, and the host resource associated with each resource identifier further includes at least one server.

14. The system as recited in claim 11, wherein each resource identifier corresponding to an e-mail messaging account.

15. The system as recited in claim 11, wherein the mechanism of each respective dispenser position further comprises:
   a device containing at least one Uniform Resource Locator (URL) data element; and
   a retrieval mechanism to retrieve the at least one URL data element from said device.

16. The system as recited in claim 15, wherein said device further includes a card encoded with an Internet Protocol (IP) address of an e-mail account.

17. The system as recited in claim 11, wherein the mechanism of each respective dispenser position further comprises:
   a card encoded with a network address of an e-mail account; and
   a reader to retrieve the network address from said card.

18. The system as recited in claim 17, wherein said communications network comprises the Internet, and the network address includes a Uniform Resource Locator (URL) data element.

19. The system as recited in claim 17, wherein said card being a payment-type card adapted to contain the network address of the e-mail account.

20. The system as recited in claim 19, wherein said payment-type card being adapted to have the network address of the e-mail account encoded on at least one magnetic element thereof.

21. The system as recited in claim 17, wherein said viewer enabling viewing of e-mail messages retrieved from the e-mail account by operation of said access device using the network address.

22. An apparatus for use in combination with a fuel dispenser environment and a communications network, said apparatus comprising:
   a connection device to connect to said communications network;
   a mechanism to provide at least one Uniform Resource Locator (URL) data element each specifying a host resource in said communications network;
   an access device to access the host resource specified by a one of the at least one resource identifier and to receive information retrieved therefrom; and
   a viewer operatively coupled to said access device;
   wherein the retrieved information comprises electronic messages.

23. The apparatus as recited in claim 22, wherein said mechanism further comprises:
   a portable storage device containing the at least one URL data element; and
   a retrieval device to retrieve the at least one URL data element from said portable storage device.

24. The apparatus as recited in claim 23, wherein said storage device further includes a card, and said retrieval device further includes a read module adapted to enable operative reading of said card.

25. The apparatus as recited in claim 24, wherein said card being encoded with an Internet Protocol (IP) address of an e-mail account.

26. The apparatus as recited in claim 25, wherein the e-mail account being associated with a customer furnishing said card.

27. The apparatus as recited in claim 22, wherein said mechanism further comprises:

a card encoded with a network address of an e-mail account; and a reader to retrieve the network address from said card.

28. The apparatus as recited in claim 27, wherein said communications network comprises the Internet, and the network address includes a Uniform Resource Locator (URL) data element.

29. The apparatus as recited in claim 27, wherein said card being a payment-type card adapted to contain the network address of the e-mail account.

30. The apparatus as recited in claim 29, wherein said payment-type card being adapted to have the network address of the e-mail account encoded on at least one magnetic element thereof.

31. The apparatus as recited in claim 27, wherein said viewer enabling viewing of e-mail messages retrieved from the e-mail account by operation of said access device using the network address.

32. An apparatus for use in combination with a fuel dispenser environment and a communications network, said apparatus comprising:

a connection device to connect to said communications network;

a card encoded with a network address of an e-mail messaging resource in said communications network;

a reader to retrieve the network address from said card; and an access device to access the e-mail messaging resource using the network address and to receive information retrieved therefrom.

33. The apparatus as recited in claim 32, further comprises:

a viewer to view the information retrieved from the e-mail messaging resource.

34. The apparatus as recited in claim 32, wherein the information retrieved from the e-mail messaging resource comprises electronic messages.

35. The apparatus as recited in claim 32, wherein said communications network further includes the Internet, and the network address further includes a Uniform Resource Locator (URL) data element.

36. The apparatus as recited in claim 32, wherein said card being furnished by a customer.

37. The apparatus as recited in claim 32, wherein said card being a finance-related device suitable for use in tendering payment.

38. The apparatus as recited in claim 37, wherein said card being one of a credit card arid a debit card adapted to have the network address encoded thereon.

39. A method for use in a fuel dispenser environment having a connection to a communications network, said method comprising the steps of:

providing at least one resource identifier each specifying a host resource in said communications network;

accessing the host resource specified by a one of the at least one resource identifier;

retrieving information from the accessed host resource, the retrieved information comprising electronic messages; and displaying the retrieved information.

40. The method as recited in claim 39, wherein the at least one resource identifier further includes at least one Uniform Resource Locator (URL) data element.

41. The method as recited in claim 39, wherein said communications network further includes the Internet, and the host resource associated with each resource identifier further includes at least one server.

42. The method as recited in claim 39, wherein the step of providing at least one resource identifier further comprises the steps of:

providing a device containing at least one Uniform Resource Locator (URL) data element; and retrieving the at least one URL data element from said device.

43. The method as recited in claim 42, wherein the step of providing a device further includes the steps of:

providing a card encoded with an Internet Protocol (IP) address of an e-mail account.

44. The method as recited in claim 39, wherein the step of providing at least one resource identifier further comprises the steps of:

providing a card-type device encoded with a network address of an e-mail account; and retrieving the network address from said card-type device.

45. A system for use in combination with a fuel dispenser environment and a communications network, said system comprising:

a connection means to connect to said communications network;

a storage element containing at least one resource identifier each specifying a host resource in said communications network;

a retrieval device to retrieve at least one of the at least one resource identifier from said storage element; and an access means to access the respective host resource specified by each retrieved resource identifier and to receive information retrieved therefrom, wherein the information received from the accessed host resource comprises electronic messages.

46. The system as recited in claim 45, wherein said storage element comprises:

a card-type device bearing at least one Uniform Resource Locator (URL) data element.

47. The system as recited in claim 46, wherein said retrieval device comprises:

a card reader.

48. The system as recited in claim 45, wherein each resource identifier being representative of a network address in said communications network.

49. The system as recited in claim 45, wherein each host resource comprising a respective e-mail messaging account.

50. The system as recited in claim 45, wherein said communications network comprises the Internet.

51. The system as recited in claim 45, further comprises:

a viewing assembly to enable viewing of information retrieved from an accessed host resource.

* * * * *